(12) United States Patent
Neff

(10) Patent No.: US 11,673,676 B2
(45) Date of Patent: Jun. 13, 2023

(54) HYBRID VTOL AERIAL VEHICLE

(71) Applicant: William J. Neff, Sandy, UT (US)

(72) Inventor: William J. Neff, Sandy, UT (US)

(73) Assignee: William J. Neff, Sandy, UT (US)

( * ) Notice: Subject to any disclaimer, the term of this patent is extended or adjusted under 35 U.S.C. 154(b) by 498 days.

(21) Appl. No.: 15/902,917

(22) Filed: Feb. 22, 2018

(65) Prior Publication Data

US 2019/0256200 A1 Aug. 22, 2019
US 2022/0388639 A9 Dec. 8, 2022

Related U.S. Application Data

(60) Provisional application No. 62/462,859, filed on Feb. 23, 2017.

(51) Int. Cl.
| | |
|---|---|
| *B64D 27/24* | (2006.01) |
| *B64C 29/00* | (2006.01) |
| *B64U 50/19* | (2023.01) |
| *B64D 27/04* | (2006.01) |
| *B64C 27/52* | (2006.01) |
| *B64D 31/06* | (2006.01) |
| *B64C 27/08* | (2023.01) |
| *B64C 39/02* | (2023.01) |
| *B64D 27/02* | (2006.01) |

(52) U.S. Cl.
CPC .............. *B64D 27/04* (2013.01); *B64C 27/08* (2013.01); *B64C 27/52* (2013.01); *B64C 29/0016* (2013.01); *B64D 27/24* (2013.01); *B64D 31/06* (2013.01); *B64C 39/024* (2013.01); *B64C 39/026* (2013.01); *B64D 2027/026* (2013.01); *B64U 50/19* (2023.01)

(58) Field of Classification Search
CPC .............. B64D 27/24; B64D 2027/026; B64C 2201/066; B64C 29/0016; B64C 29/0025; B64C 29/0033
See application file for complete search history.

(56) References Cited

U.S. PATENT DOCUMENTS

| | | |
|---|---|---|
| 6,464,166 B1 | 10/2002 | Yoeli |
| 8,794,566 B2 | 8/2014 | Hutson |
| 9,364,766 B2 | 6/2016 | Mielniczek |
| 9,796,482 B2 | 10/2017 | Apkarian |
| 10,322,796 B2 | 6/2019 | Lee |

(Continued)

OTHER PUBLICATIONS

Kang, English abstract of KR2018106253A (Year: 2018).
(Continued)

*Primary Examiner* — Nicholas McFall
(74) *Attorney, Agent, or Firm* — Workman Nydegger

(57) ABSTRACT

Variations of an aerial vehicle, all with capability of vertical take-off and landing (VTOL), with one variation comprising at least three engines, at least three rotors, a flight control system, battery, and propulsion system. The second VTOL aerial vehicle variation being a hybrid with engine-powered rotors and electric-powered rotors configured to work with a flight control system and battery. The first and second variations having the option of a genset system which recharges the battery. The third VTOL aerial vehicle variation being all-electric-powered rotors configured to work with a flight control system and a genset system which powers the rotors and/or recharges the battery.

19 Claims, 8 Drawing Sheets

(56) References Cited

U.S. PATENT DOCUMENTS

| | | | |
|---|---|---|---|
| 2004/0104303 A1 | 6/2004 | Mao | |
| 2006/0016930 A1 | 1/2006 | Pak | |
| 2006/0226281 A1* | 10/2006 | Walton | B64C 29/0033 |
| | | | 244/17.23 |
| 2008/0048065 A1 | 2/2008 | Kuntz | |
| 2016/0137304 A1 | 5/2016 | Phan et al. | |
| 2016/0236790 A1* | 8/2016 | Knapp | G08G 5/0052 |
| 2016/0280075 A1* | 9/2016 | McGrady | B64D 27/24 |
| 2016/0280386 A1* | 9/2016 | Mestler | B64C 39/024 |
| 2017/0029131 A1* | 2/2017 | Steinwandel | B64C 29/0025 |
| 2017/0369161 A1* | 12/2017 | Alzahrani | B64C 29/0033 |
| 2018/0065743 A1* | 3/2018 | Vondrell | H02P 9/04 |
| 2018/0201384 A1* | 7/2018 | Barth | B64D 27/24 |
| 2018/0354607 A1 | 12/2018 | Marot et al. | |
| 2018/0362160 A1* | 12/2018 | Groninga | B64C 29/0033 |
| 2019/0061964 A1* | 2/2019 | Murrow | B64C 29/0025 |
| 2020/0023701 A1 | 1/2020 | Salem | |
| 2020/0172234 A1 | 6/2020 | Neff | |
| 2021/0387739 A1 | 12/2021 | Neff | |

OTHER PUBLICATIONS

Final Office Action received for U.S. Appl. No. 16/206,862, dated Dec. 18, 2020, 9 pages.
INRIX 2015 Traffic Scorecard Sets Benchmark for U.S. Cities as Federal Government Accelerates Smart City Spending, https://inrix.com/press-releases/scorecard-us/, Jan. 12, 2021.
Malloy Aeronautics, https://www.hover-bike.com/#lightbox[gallery_imge_1]/0, Jan. 12, 2021.
Non-Final Office Action received for U.S. Appl. No. 16/206,862, dated Jun. 9, 2020, 10 pages.

* cited by examiner

HYBRID VTOL AERIAL VEHICLE

CROSS-REFERENCE TO RELATED APPLICATION

This application claims priority to and the benefit of U.S. Provisional Application No. 62/462,859, filed Feb. 23, 2017.

FIELD OF THE INVENTION

This disclosure relates to aerial vehicles and power systems for aerial vehicles.

BACKGROUND OF THE INVENTION

Currently, the principal approaches for practical vertical-takeoff-and-landing (VTOL) flight vehicles can be grouped into three broad categories: high-speed vehicles using jet thrust or variations of jet thrust and highly loaded lifting fans (e.g., the Harrier and the JSF/F-35B); medium-speed vehicles with rotors (e.g., helicopters and tilt-rotors); and low-speed lifting fan or ducted fan vehicles with more than one lifting fan (such as a flying platform like the Piasecki Flying Jeep). These approaches are differentiated by many factors, but one of the most significant factors is the thrust loading for the propulsion system that provides lift for takeoff and transition to wing-borne low-speed forward flight. The thrust loading (pounds per square foot loading of the propulsor), or power loading (pounds of thrust per shaft horsepower) of the propulsor(s), determines the power required to lift the aircraft and the velocity of the corresponding momentum stream (downwash) below it.

In many designs, the propulsion system is used to provide both vertical forces for hover and horizontal forces for forward flight. This can be done by tilting the VTOL propulsion device (e.g., the rotor in a helicopter or tilt-rotor) or by providing a separate propulsion device. Some implementations of VTOL aircraft such as flying platforms (e.g., the Piasecki Flying Jeep) generate horizontal propulsion forces by tilting the entire vehicle.

Jet-Thrust VTOL Systems

The high-speed VTOL/STOVL vehicles use either direct jet thrust to support the aircraft during takeoff and landing (as in the case of the Boeing X-32 JSF entry or the Harrier) or jet thrust combined with a highly loaded, mechanically driven fan (e.g., a turbofan or a shaft-driven lift fan as used in the Lockheed-Martin F-35B). These vehicles operate at very high propulsor thrust loadings, e.g., on the order of 2500 lb/ft$^2$ or higher for the jet engines and 1500 lb/ft$^2$ for the direct-driven lift fans. As a result of such high thrust loadings, these aircraft must operate with far more power than helicopters and tilt-rotors in VTOL flight. These vehicles are inherently high-speed aircraft, with engines sized (as a result of their inefficiency for VTOL propulsion) for very high power levels.

The downwash velocities associated with direct-lift jet or lift fan systems is very high—between 800 feet/sec (lift fan) and 2000 feet/sec (jet thrust). This is dangerously high for ground personnel, and it makes it unlikely that these vehicles could be operated from any but carefully prepared reinforced surfaces. Additionally, the exhaust temperatures associated with direct-jet-thrust systems is very high—up to 1200° F.—thus posing an additional problem for near-ground operations.

Helicopters and Tilt-Rotors

Helicopters are very efficient for VTOL and low-speed flight because they operate at low thrust loadings (typically 20-30 lb/ft$^2$), which greatly reduces both power requirements and downwash velocity. However, a generally large rotor diameter is required to achieve the desirable low thrust loadings. The large diameter rotors operate at relatively low rotational speeds (to avoid problems with supersonic flow on the blades), so heavy, high-torque transmissions and shafting are needed to drive them. Moreover, the sheer size of the unprotected rotor disk leads to handling and safety issues with blade strike in obstacle-rich environments.

Furthermore, rotorcraft normally use articulated rotors for control by changing the collective and cyclic pitch of individual blades through a swashplate. The blades must be mounted in a hub that supports the blades and lets them rotate for pitch changes. As a result of this configuration, rotorcraft are mechanically complex and are subject to large vibratory loads as loading changes on the rotating blades. Torques generated by the rotor must be balanced, either by a tail rotor or another main rotor, further increasing complexity and weight.

Tilt-rotors combine helicopter VTOL efficiency with wing-borne flight at higher speeds by tilting the entire rotor system to act as propellers for forward flight. Tilt-rotors operate at higher thrust loading (typically 40-70 lb/ft$^2$), with consequently higher power requirements and downwash velocity. Tilt-rotors also use the same mechanically complex collective and cyclic pitch control scheme for the rotors.

One of the great benefits of both helicopters and tilt-rotors is that they provide high levels of control in VTOL and low-speed flight. Their low downwash velocities permit operation over relatively unprepared surfaces and pose minimal danger to nearby ground personnel.

Hovering Platforms and Ducted Fans

Ducted fan aircraft and hovering platforms operate at intermediate propulsion system thrust loadings (on the order of 100-250 lb/ft$^2$), with increased power requirements and associated downwash velocities as compared to helicopters but at a fraction of the downwash velocities associated with jet thrust-based VTOL systems. One advantage of these systems is that the rotors are contained within a shroud or duct that protects from blade strike with other objects.

Flying platforms are a type of fan-driven vehicles in this category. These vehicles are typically built around two or three vertically oriented, fixed fans arranged in a flat body to provide lift. Power is applied to the fans by a mechanically complex transmission and shafting arrangement. Examples of this type of aircraft include the Piasecki Flying Jeep, which was built for the U.S. Army and Navy in the 1960's. The flying platforms were limited in control in VTOL and forward flight, depending on rotor blade pitch or throttle for vertical control and vanes in the fan flow for yaw and roll control. Flying platforms were primarily used for hover and low-speed flight, using tilt of the overall vehicle lift vector to provide thrust for forward flight. These vehicles had relatively low maximum speeds (less than 100 knots) and became difficult to control at high speeds due to aerodynamic problems with the ducts in axial cross-flow.

More recent examples of flying platforms include the UrbanAero X-Hawk and the vehicle illustrated in U.S. Pat. No. 6,464,166. These aircraft use sets of vanes in the inflow and exit flow of the fans to generate moments and side forces, and variable pitch propellers for lift control. A separate set of fans is used to provide thrust for forward flight. A fly-by-wire control system is used to automate vehicle control. These aircraft are mechanically complex, with transmission and gearboxes to distribute engine power to the fans and rotors. Maximum speeds for these vehicle is very limited—only 80-100 knots.

In striving to find an aerial vehicle that is suitable for civilian commuter use, the jet-thrust VTOL systems are less desirable due to exorbitant cost, need for a special tarmac capable of sustaining the high temperature from the thrust, as well as the potential danger imposed by being nearby. The helicopter and tilt-rotor systems also pose problems due to high cost and potential danger of being in vicinity of the exposed rotors. The aerial vehicle most easily adapted to use as a means of commuting to and from work is a variant of a hovering aerial vehicle, illustratively with the use of ducted fans. For ease of control, such a vehicle may also have the capability to contain electric motors powering the rotors for highly responsive maneuvers in controlled flight similar to radio controlled (RC) drones or "quadcopters." Also having a quadcopter design with fixed rotors would reduce the need for an expensive and complex swashplate system. Having an all-electric (only battery powered) quadcopter large enough to carry a person (e.g., Ehang 184 or Hoversurf's Scorpion-3) proposes an option as a daily commuter vehicle for short distance travel; however the all-electric format may hamper the effectiveness of this vehicle due to limited flight time. Illustratively, this problem may be solved by use of a hybrid engine and electric powered system or a system in which the engine is coupled to a generator (referred to as a genset) to power the electric motor powering the rotors and/or recharges the battery, thereby extending the flight time and creating an aerial vehicle that can be truly used as a daily commuting vehicle and many other useful applications.

There is a need for a VTOL aerial vehicle which allows for transportation of people or cargo. As shown supra, today VTOL applications are confined to large and very expensive aerial vehicles such as generally seen in the military or lightweight unmanned-aerial-vehicle (UAVs) that are commonly referred to as battery powered radio-controlled quadcopters or drones. The large aerial vehicles can transport people, but require a large footprint for the take-off and landing zones dues to dangerous overhead rotors and flying debris. Having the functionality and responsiveness of the small RC quadcopters scaled up to a large quadcopter would be useful and could transport people or cargo, but currently these applications do not yet have sufficient battery power to lift one or more persons or other cargo for a sustained amount of time such as one hour or more. A typical conventional multi-rotor UAV relies on a rechargeable battery to provide power to drive the rotor motors coupled to the propellers to provide flight. A typical conventional small multi-rotor VTOL quadcopter/drone, not a fixed wing craft, includes a lithium polymer (LiPo) battery which may provide a typical loaded flight time of about 10-15 minutes. Even with advanced lithium sulfur batteries flight times with small payloads are limited to about 20-30 minutes. Therefore, until batteries are improved to allow for longer flight times with a heavier load, other options are needed.

An aerial vehicle that could be used for a person to commute to work through the air over the congested road traffic can save a commuter many hours a year from being stuck in traffic. According to the transportation analytics firm Inrix, across the U.S. commuters spent more than 8 billion extra hours of traffic in 2015. The U.S. cities with the worst traffic in terms of average time wasted per commuter: Los Angeles—81 hours, Washington, D.C. and San Francisco—75 hours per year. (See http://inrix.com/press/scorecard-us/). Also, not all roads are constructed in a straight line. Thus, even with light traffic, much time can be wasted in commuting if rivers, mountainous terrain or other obstacles hinder the most direct path from point A to point B.

Thus, there is a need for an aerial vehicle which can provide sufficient power to lift a substantial load for a longer duration than what small UAVs are currently capable of. While this longer flight time has been extended for small unmanned drones, see US Patent Application No: 20160137304, such is for micro drones not capable of carrying the weight of the payload of a manned quadcopter or drone as disclosed here in claim 9, which carves out the field for manned applications.

One solution is a gas powered hoverbike (See http://www.hover-bike.com/#Lightbox[gallery image 1]/0). However, the hoverbike P1 machine could only "get airborne" while being tethered to the ground because it lacked the controls for stabilized flight. The P2, which recently debuted, was converted from a gas engine-mechanical powered machine to a battery-electric powered machine, thereby enabling it to fly with stabilization controls, but it currently lacks the longevity of flight which would be required for the typical commuter. The illustrative embodiments described herein solve these problems by: 1) having stabilization controls for a gas powered machine; or 2) providing a hybrid machine where the gas powered rotors do the "heavy lifting" for increased payload capabilities while the electric-powered rotors stabilize and provide thrust; or 3) having all rotors as electric-powered, but having a genset system that increases the duration of flight time, through directly powering the rotors or recharging the battery pack in flight, or otherwise.

SUMMARY

The following implementations and aspects thereof are described and illustrated in conjunction with systems, machines, and methods that are meant to be exemplary and illustrative, not necessarily limiting in scope. In various implementations one or more of the above-described problems have been addressed, while other implementations are directed to other improvements.

First, in various embodiments, a manned or unmanned aerial vehicle is provided, the aerial vehicle comprising at least three engines configured to drive at least three or more rotors to rotate, rotation of the rotors generating thrust and causing the aerial vehicle to fly. In various embodiments, the aerial vehicle comprises an electronic speed control configured to control an amount of power provided to the at least three engines. Further, in various embodiments, a manned or unmanned aerial vehicle comprises at least three engines, gas or otherwise, configured to generate mechanical power to the rotors. In various embodiments, a manned or unmanned aerial vehicle comprises a propulsion system configured to provide power from the engines to the rotors, illustratively by affixing the rotors to a direct drive shaft attached to the engines or to a shaft powered by the engines with belts and pulleys or drive shaft and gear boxes configured to provide power to the rotors. Additionally, in various embodiments, a manned or unmanned aerial vehicle comprises a generator motor coupled to the engines and configured to generate AC power using the mechanical power generated by the engines. Further, in various embodiments, a manned or unmanned aerial vehicle comprises a bridge rectifier configured to convert the AC power generated by the generator motor to DC power and provide the DC power to the rechargeable battery pack. In various embodiments, a manned or unmanned aerial vehicle comprises an electronic control unit configured to control a throttle of the engines based, at least in part, on a power demand of at least one load, the at least one load including the rotors. In various embodiments, a manned or unmanned aerial vehicle comprises an at least three engines, gas or otherwise, configured to generate mechanical power to the rotors, a non-rechargeable battery pack providing power to an electric control unit. In various embodiments, a manned or unmanned aerial vehicle comprises a gyroscope or computer working in concert with the electronic speed control unit enabling stabilization of the aerial vehicle for controlled flight.

Second, in various embodiments, a manned or unmanned aerial vehicle is provided comprising a hybrid mechanical and electric propulsion system of at least one engine configured to drive at least one or more rotors to rotate, rotation of the rotors generating thrust and causing the aerial vehicle to fly and a battery pack, illustratively rechargeable, providing power to an electronic speed controller, which provides power to drive at least one electric rotor motor causing the at least one rotor to rotate, rotation of the at least one rotor generating thrust and providing stability causing the aerial vehicle to fly in a controlled manner. In various embodiments, the aerial vehicle comprises an electronic speed control configured to control an amount of power provided to the at least one engine. Additionally, in various embodiments, a manned or unmanned aerial vehicle comprises at least one fuel cell, hydrogen or otherwise, acting as the engine and configured to provide power to either or both the rechargeable battery and the at least one rotor motor. Further, in various embodiments, a manned or unmanned aerial vehicle comprises at least one engine, gas or otherwise, configured to generate mechanical power to the at least one rotor. In various embodiments, a manned or unmanned aerial vehicle comprises a propulsion system configured to provide power from the engines to the at least one rotor, whether by affixing the at least one rotor to the direct drive shaft attached to the engines or to a shaft powered by the engines with belts and pulleys or drive shaft and gear boxes configured to provide power to the at least one rotor. Additionally, in various embodiments, a manned or unmanned aerial vehicle comprises a generator motor coupled to the engines and configured to generate AC power using the mechanical power generated by the engines. Further, in various embodiments, a manned or unmanned aerial vehicle comprises a bridge rectifier configured to convert the AC power generated by the generator motor to DC power and provide the DC power to the rechargeable battery pack. In various embodiments, a manned or unmanned aerial vehicle comprises an electronic control unit configured to control a throttle of the engines based, at least in part, on a power demand of at least one load, the at least one load including the at least one rotor. In various embodiments, a manned or unmanned aerial vehicle comprises an at least one engine, gas or otherwise, configured to generate mechanical power to the at least one rotor, a non-rechargeable battery pack providing power to an electric control unit. Further, in various embodiments, a manned or unmanned aerial vehicle comprises at least one electric rotor motor, configured to provide power to the at least one rotor. In various embodiments, a manned or unmanned aerial vehicle comprises a propulsion system configured to provide power from the battery pack to the at least one rotor motor. In various embodiments, a manned or unmanned aerial vehicle comprises a gyroscope or computer working in concert with the electronic speed control unit enabling stabilization of the aerial vehicle for controlled flight.

Third, in various embodiments, a manned aerial vehicle comprising at least one electric rotor motor configured to drive at least one rotor to rotate, rotation of the at least one rotor generating thrust and causing the aerial vehicle to fly. In various embodiments, the aerial vehicle comprises an electronic speed control configured to control an amount of power provided to the at least one rotor motor. Further, in various embodiments, a manned aerial vehicle comprises a genset system configured to provide power to the at least one rotor motor. In various embodiments, a manned aerial vehicle comprises a rechargeable battery configured to provide power to the at least one rotor motor. Additionally, in various embodiments, a manned aerial vehicle comprises at least one fuel cell, hydrogen or otherwise, acting as the engine to provide power to either or both the rechargeable battery and the at least one rotor motor. Further, in various embodiments, a manned aerial vehicle comprises an engine configured to generate mechanical power. Additionally, in various embodiments, a manned aerial vehicle comprises a generator motor coupled to the engine and configured to generate AC power using the mechanical power generated by the engine. Further, in various embodiments, a manned aerial vehicle comprises a bridge rectifier configured to convert the AC power generated by the generator motor to DC power and provide the DC power to either or both the rechargeable battery and the at least one rotor motor. In various embodiments, a manned aerial vehicle comprises an electronic control unit configured to control a throttle of the engine based, at least in part, on a power demand of at least one load, the at least one load including the at least one rotor motor. In various embodiments, a manned or unmanned aerial vehicle comprises a gyroscope or computer working in concert with the electronic speed control unit enabling stabilization of the aerial vehicle for controlled flight.

These and other advantages will become apparent to those skilled in the relevant art upon a reading of the following descriptions and a study of the several examples of the drawings.

DETAILED DESCRIPTION

Figure 1:
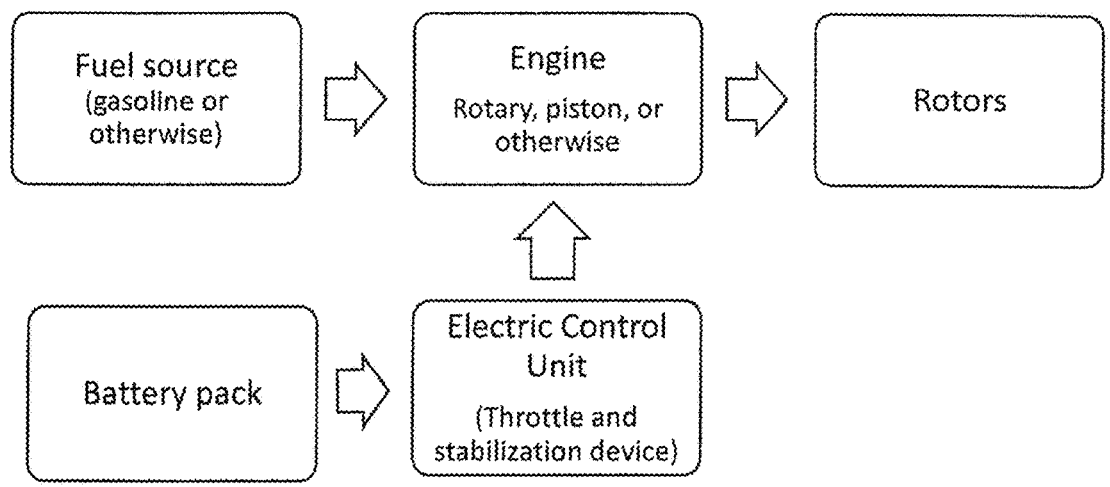
FIG. 1 Diagram depicting a possible configuration of an illustrative embodiment of an aerial vehicle, which shows an engine-powered mechanical propulsion system for the aerial vehicle.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, any claims herein are not to be limited to that embodiment. Moreover, any such claims are not to be read restrictively unless there is clear and convincing evidence manifesting a certain exclusion, restriction, or disclaimer.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art.

One or more embodiments of a genset system provide a power source with energy conversion efficiency. In manned aerial vehicle applications, the genset system of one or more embodiments can be used to overcome the weight of the vehicle and load necessary to provide extended endurance and load capabilities.

FIG. 1 is a diagram depicting one embodiment of an aerial vehicle, which includes an engine-powered mechanical propulsion where speed of the engines are controlled by the electric control unit which consist of a stepper motor or some other throttle mechanism and works congruently with the stabilization device, a gyroscope or other computer aided instrument to maintain controlled flight. The engine drives the rotor, which is attached to the engine via a drive mechanism, wherein the drive mechanism may be a direct connection illustratively via a vertical drive shaft, or through a gear reduction drive, or through other means such as shafts and gearboxes or belts and pulleys. A fuel source supplies fuel to the engine, while a battery pack provides power to the electric control unit.

Figure 2:
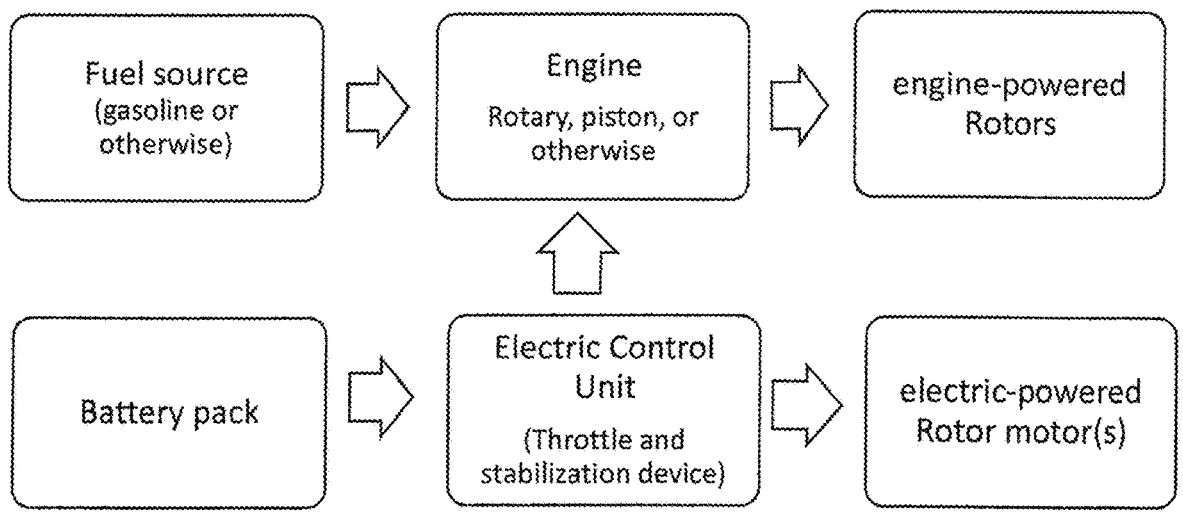
FIG. 2 Diagram depicting a possible configuration of an illustrative embodiment of an aerial vehicle, which includes a hybrid propulsion system comprised of an engine-powered mechanical propulsion of the rotors and an electrically-powered rotor motor.

FIG. 2 is a diagram depicting another embodiment of an aerial vehicle, which includes a hybrid propulsion system comprised of an engine-powered mechanical propulsion of the rotors and an electrically-powered rotor motor. Where both speed of the engines and speed of rotor motor are controlled by the electric control units which works congruently with the stabilization device, a gyroscope or other computer aided instrument is used to maintain controlled flight. The mechanical powered rotor is attached to the engine directly via a vertical drive shaft, or through a gear reduction drive, or through other means such as shafts and gearboxes or belts and pulleys. The electric powered rotor may be attached directly to the rotor motor. A fuel source supplies fuel to the engine, while a battery pack provides power to the electric control units for the engine speed and for the electric rotor motors.

Figure 3:
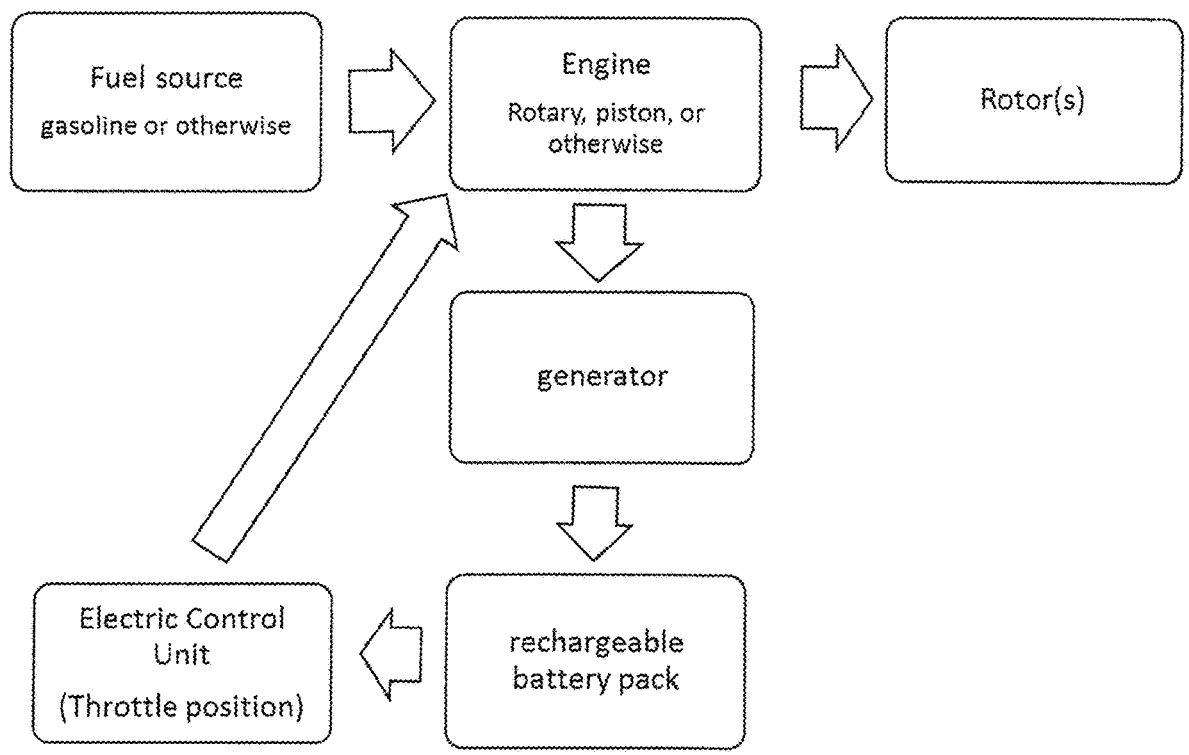
FIG. 3 Diagram depicting a possible configuration of an illustrative embodiment of an aerial vehicle, which includes an engine-powered mechanical propulsion of the rotors and where the engine is part of a genset system, which can recharge a battery pack.

FIG. 3 is a diagram depicting another possible configuration of an aerial vehicle, which includes engine-powered mechanical propulsion of the rotors and where the engine is part of a genset system, which has an alternator/generator attached to the engine which generates electric power to recharge the battery pack thus allowing for longer flight time. Subsequently, the battery pack is not the limiting factor in flight duration, but instead the amount of fuel for the engine that is stored on the aerial vehicle may be limiting. The speed of the engine is controlled by the electric control unit which includes a stepper motor or some other throttle mechanism and works congruently with the stabilization device, a gyroscope or other computer aided instrument to maintain controlled flight. The rotor may be attached directly to a vertical drive shaft of the engine, or through a gear reduction drive, or through other means such as shafts and gearboxes or belts and pulleys. A fuel source supplies fuel to the engine, while the rechargeable battery pack provides power to the electric control unit.

Figure 4:
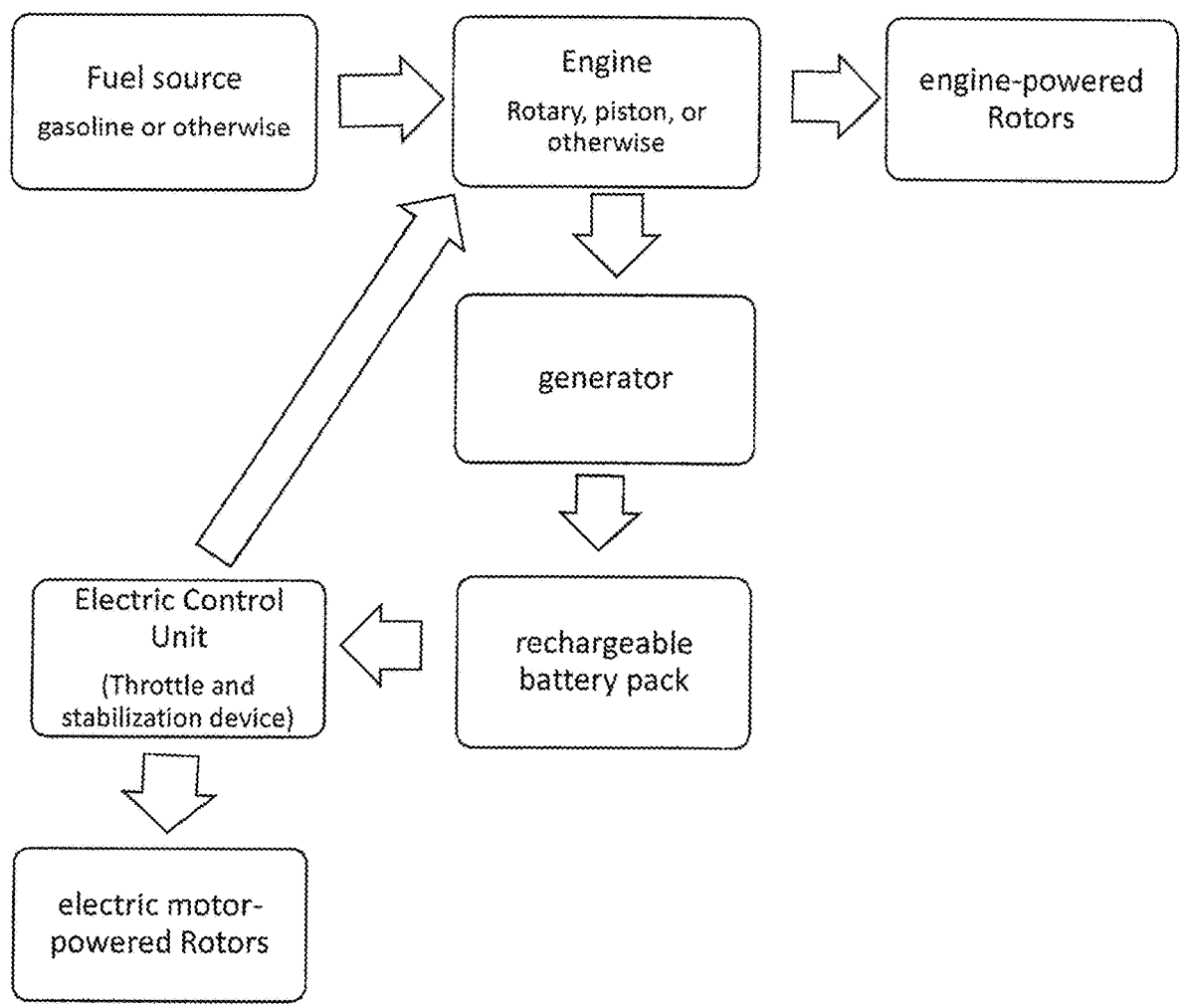
FIG. 4 Diagram depicting a possible configuration of an illustrative embodiment of an aerial vehicle, which includes a hybrid propulsion system comprised of an engine-powered mechanical propulsion of the rotors and an electrically-powered rotor motor and where the engine is part of a genset system, which can recharge a battery pack.

FIG. 4 is a diagram depicting another illustrative embodiment of an aerial vehicle, which includes a hybrid propulsion system comprised of an engine to provide mechanical propulsion of the rotors and an electrically-powered rotor motor. The engine is part of a genset system, where an alternator/generator is attached to the engine which generates electric power to recharge the battery pack thus allowing for longer life of the battery pack, thus enabling the use of a smaller battery pack or longer flight durations. Both the speed of the engine and speed of rotor motor are controlled by the electric control units which works congruently with the stabilization device, a gyroscope or other computer aided instrument to maintain controlled flight. The mechanical powered rotor may be attached directly to a vertical drive shaft of the engine, or through a gear reduction drive, or through other means such as shafts and gearboxes or belts and pulleys. The electric powered rotor illustratively is attached directly to the rotor motor. A fuel source supplies fuel to the engine, while a battery pack provides power to the electric control units for the engine speed and for the electric rotor motors.

Figure 5:
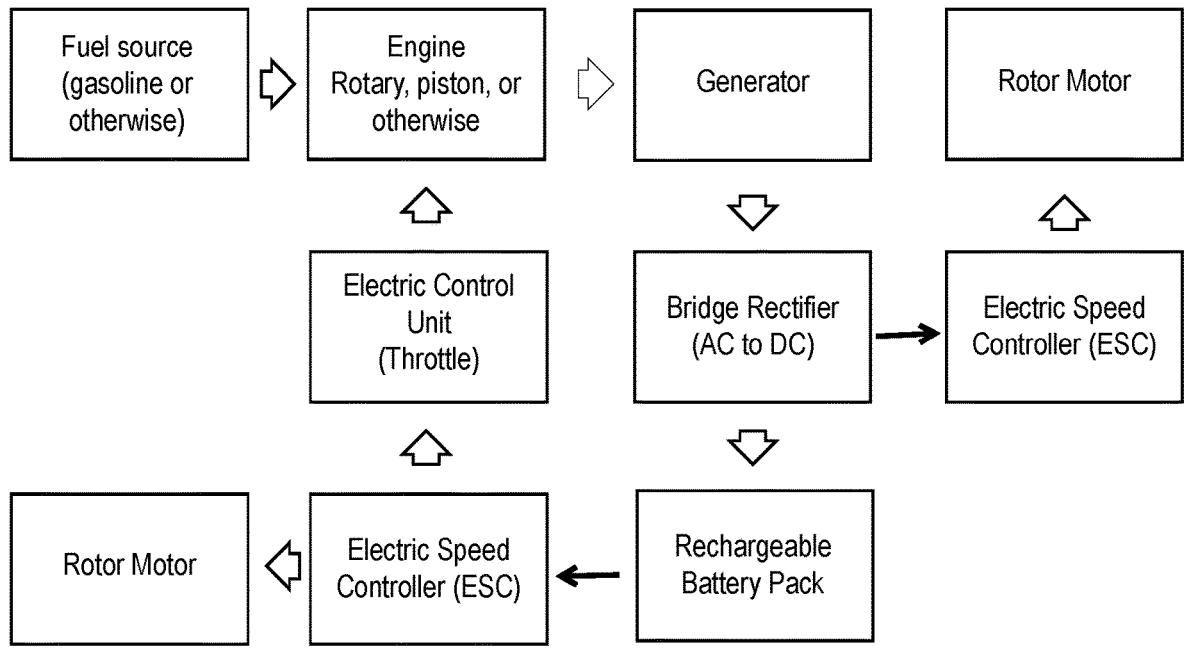
FIG. 5 Diagram depicting a possible configuration of an illustrative embodiment of an aerial vehicle, which includes electric rotor motors providing power of the rotors and where an engine is part of a genset system, which can recharge a battery pack.

FIG. 5 is a diagram depicting another illustrative aerial vehicle, which includes electric rotor motors providing power of the rotors and where an engine is part of a genset system, which has an alternator/generator attached to the engine which generates electric power. In one embodiment where DC electric motors are used, this configuration includes a bridge rectifier configured to convert the AC power generated by the genset system or generator motor to DC power and provide the DC power to either or both the rechargeable battery and an Electronic Speed Controller (ESC), which governs amount of power provided to the rotor motor(s). This genset system provides electric power to the electric motor(s) or is used to recharge the battery pack thus allowing for longer flight time. Thus, for the electric-powered rotor motor(s), the battery pack may not be the limiting factor in flight duration, but instead the length of flight may be limited by the amount of fuel for the engine that is stored on the aerial vehicle. The speed of the engine is controlled by the electric control unit which includes a stepper motor or some other throttle mechanism. The throttle to the engine can be increased thus generating more electric power from the genset system for increased power to the battery pack or otherwise. The ESC and works congruently with the stabilization device, a gyroscope or other computer aided instrument to maintain controlled flight. The rotor is attached directly to the electric rotor motor. A fuel source supplies fuel to the engine, while the rechargeable battery pack provides power to the electric control units for the engine speed and for the electric rotor motors.

Figure 6:
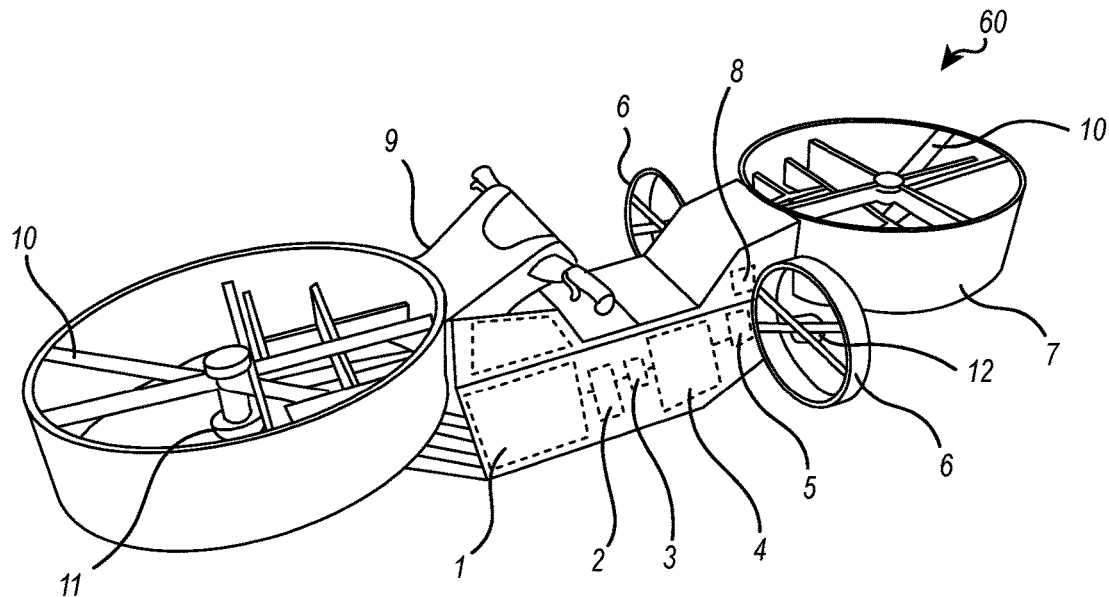
FIG. 6 shows an illustrative embodiment of an aerial vehicle according to the diagram of FIG. 4, where the mechanical powered rotor may be sufficiently large to do the "heavy lifting" while the smaller rotors may be electric powered for stabilizing the aerial vehicle and provide additional forward thrust.

FIG. 6 depicts one possible embodiment of the aerial vehicle 60 as described in FIG. 4. This includes a fuel source 9, e.g., a vessel for storing gasoline, a mixture of gasoline and oil mixture, hydrogen, or similar type fuel or mixture. The fuel source 9 provides fuel to an engine or fuel cell 1, of a first power system. The engine 1 can use the fuel provided by the fuel source to generate mechanical energy. While one engine 1 is depicted, it is understood that the use of multiple engines are within the scope of this invention. The mechanical energy can be transferred from the engine 1 crank/driveshaft (not shown) to the mechanically powered rotors 10 belts and pulleys 11, although it is understood that other drive means may be used such as shafts and gearboxes. The engine will be part of the genset (engine-generator) system, which includes an alternator/generator motor 2 coupled to the engine 1. While a genset system is depicted, it is understood that the use of a fuel cell, hydrogen or otherwise, to provide electric power is within the scope of this invention. The generator motor 2 functions to generate AC output power using mechanical power generated by the engine. In various embodiments, a shaft (not shown) of the engine 1 includes a fan (not shown) that dissipates heat away from the engine. In various embodiments, the generator motor is coupled to the engine through a polyurethane coupling. The genset system includes a bridge rectifier 3 and a rechargeable battery 4. The bridge rectifier 3 is coupled between the generator motor 2 and the rechargeable battery 4 and converts the AC output of the generator motor 2 to DC power to charge the rechargeable battery 4 or provide DC power to electric motor 12 with use of an electric speed control (ESC) 5 to govern amount of power supplied to electric motor 12. The ESC 5 can control the power provided by bridge rectifier 3 and/or rechargeable battery 4 to rotor motor 12 provided by generator motor 2. Rotor motor 12 powers a rotor 6, which may be inside a duct or shroud as shown in this FIG. 6. As shown, there are two rotors 6, one on either side of aerial vehicle 60. Although only one rotor motor 12 may be seen in FIG. 6, it is understood that each rotor 6 may be provided with a rotor motor. It is understood that if rotor motor 12 runs on AC current, then a DC-to-AC inverter is configured into the system to provide AC power to electric motor 12. The rechargeable battery 4 may thereby provide DC or AC power to rotor motor 12 depending upon type of electric motor used. Although only one ESC is shown, each electric motor 12 may have its respective ESC 5 governing the amount of power to that motor and the engine may have its separate speed control unit to govern the throttle position. In one example, an output of the bridge rectifier 3 and/or the rechargeable battery 4 is provided to one or more ESCs 5 integrated with the stabilization device 8, which may be a gyroscope or some other computer aided device used for controlled flight of the aerial vehicle. It is understood that some flight controllers (not shown) combine the ESC, the stabilization device, as well as a battery management system, battery monitor logger, and battery indicator display into one component or one single device.

Figure 7:
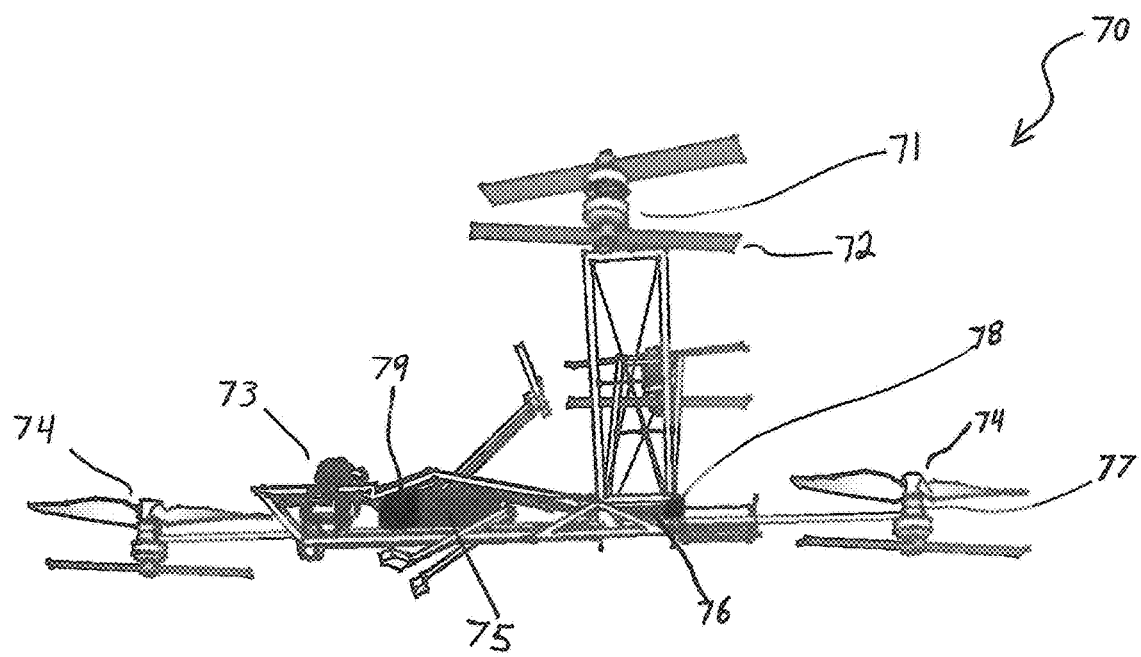
FIG. 7 shows an illustrative embodiment of an aerial vehicle according to the diagram of FIG. 2, wherein the aerial vehicle is a hybrid mechanical and electrical powered aerial vehicle.

FIG. 7 shows one possible embodiment as described in FIG. 2, showing a hybrid mechanical and electrical powered aerial vehicle 70. This includes a fuel source 79, e.g., a vessel for storing gasoline, a mixture of gasoline and oil mixture, or similar type fuel or mixture. The fuel source provides fuel to at least one engine 73. The engine(s) can use the fuel provided by the fuel source to generate mechanical energy. The mechanical energy can be transferred from the engine(s) crank/driveshaft to the mechanically powered rotors 74 directly using belts and pulleys 77, but it is understood that rotors may be driven by other means such as shafts and gearboxes. A battery pack 75, which provides power to the electric motor 71, is wired to its respective electric speed control (ESC) 76 to govern amount of power supplied to electric motor 71. The ESC 76 can control the amount power provided by the battery pack 75 to its respective electric rotor motor 71. The ESC 76 may be configured to work in concert with a small stepper or servo motor or actuator (not shown) that acts to adjust the throttle position of the engine 73. Electric propeller motor 71 powers the rotor 72, which creates lift allowing the aerial vehicle to fly. In one example, the battery pack 75 provides power to one or more ESCs 76 integrated with the stabilization device 78, which may be a gyroscope or some other computer aided device used for controlled flight of the aerial vehicle. It is understood that some flight controllers (not shown) combine the ESC, the stabilization device, as well as a battery management system, battery monitor logger, and battery indicator display into one component or one single device. While a battery pack 75 is depicted, it is understood that the use of a fuel cell supplied by a fuel source, hydrogen or otherwise, is within the scope of this invention.

Figure 8:
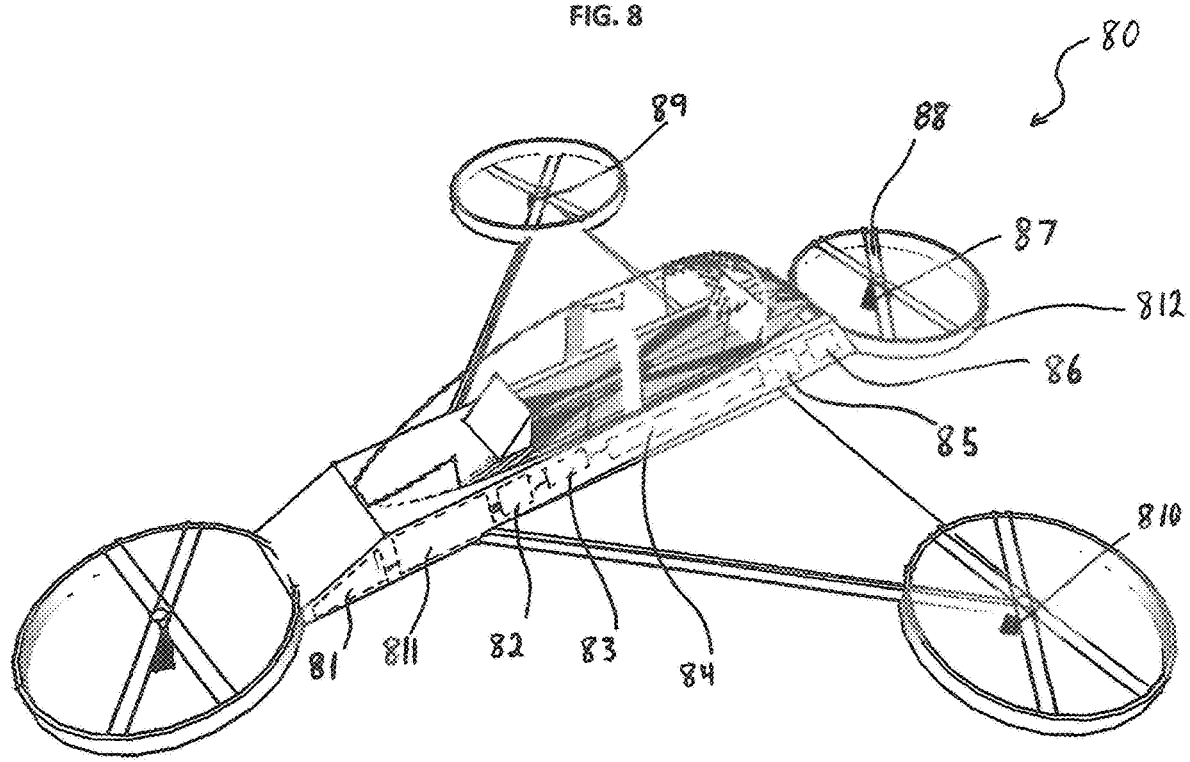
FIG. 8 shows an illustrative embodiment of an aerial vehicle according to the diagram of FIG. 5, wherein the hybrid aerial vehicle generates electrical power and where all rotors are powered electrically.

FIG. 8 is an illustrative hybrid aerial vehicle 80 of FIG. 5, wherein all rotors are powered by electric motors causing lift and flight of the aerial vehicle. Aerial vehicle 80 includes a fuel source 81, e.g., a vessel for storing gasoline, a mixture of gasoline and oil mixture, hydrogen, or similar type fuel or mixture. The fuel source provides fuel to an engine 811, which is configured to be part of a genset (engine-generator) system. The engine 811 can use the fuel provided by the fuel source 81 to generate mechanical energy. This genset system also includes an alternator or generator motor 82 coupled to the engine. The generator motor functions to generate AC output power using mechanical power generated by the engine. In various embodiments, a shaft of the engine includes a fan (not shown) that dissipates heat away from the engine. In various embodiments, the generator motor is coupled to the engine, illustratively through a polyurethane coupling. The genset system includes a bridge rectifier 83 and a rechargeable battery 84. The bridge rectifier 83 is coupled between the generator motor 82 and the rechargeable battery 84 and converts the AC output of the generator motor 82 to DC power to charge the rechargeable battery 84 or provide DC power to electric motor 87 with use of an electric speed control (ESC) 85 to govern amount of power supplied to motor. If AC motors are chosen then a DC-to-AC Inverter may be included in the system to provide AC power to the AC motor 87, which provides power to the rotor 88 causing the aerial vehicle to fly. In one example, an output of the bridge rectifier 83 and/or the rechargeable battery 84 is provided to one or more electronic speed control devices (ESC) 85 integrated with its respective rotor motors 87, which provide power to the rotor 88, which may be inside a duct or shroud 812 as shown in this FIG. 8. The ESC 85 can control the DC power provided by generator motor 82 via bridge rectifier 83 and/or rechargeable battery 84 to one or more rotor motors 87. The ESCs 85 are configured to adjust the amount of power provided to the rotor motors 87 with input from the stabilization device 86, which may be a gyroscope or some other computer aided device used for controlled flight of the aerial vehicle. In various embodiments, the ESCs 85 can control an amount of power provided to one or more rotor motors 87 in response to input received from an operator. It is understood that some flight controllers (not shown) combine the ESC, the stabilization device, as well as a battery management system, battery monitor logger, and battery indicator display into one component or one single device. While a genset system is depicted, it is understood that the use of a fuel cell, hydrogen or otherwise, to provide electric power is within the scope of this invention.

For example, if an operator provides input to move aerial vehicle to the right, then the ESC controlling the right-side rotor motor 89 can provide less power to rotor motor 89 on the right of the aerial vehicle to cause the rotor motors to spin propellers/rotors on the right side of the aerial vehicle slower causing the aerial vehicle to turn right and/or the ESC controlling the left-side motor 810 can provide more power to rotor motor 810 on the left of the aerial vehicle to cause the rotor motors to spin propellers/rotors on the left side of the aerial vehicle faster than propellers on the ride side of the aerial vehicle causing the aerial vehicle to turn right. As power is provided at varying levels to one or more rotor motors the aerial vehicle can change directions and/or speed in response to input received from an operator.

Figure 9:
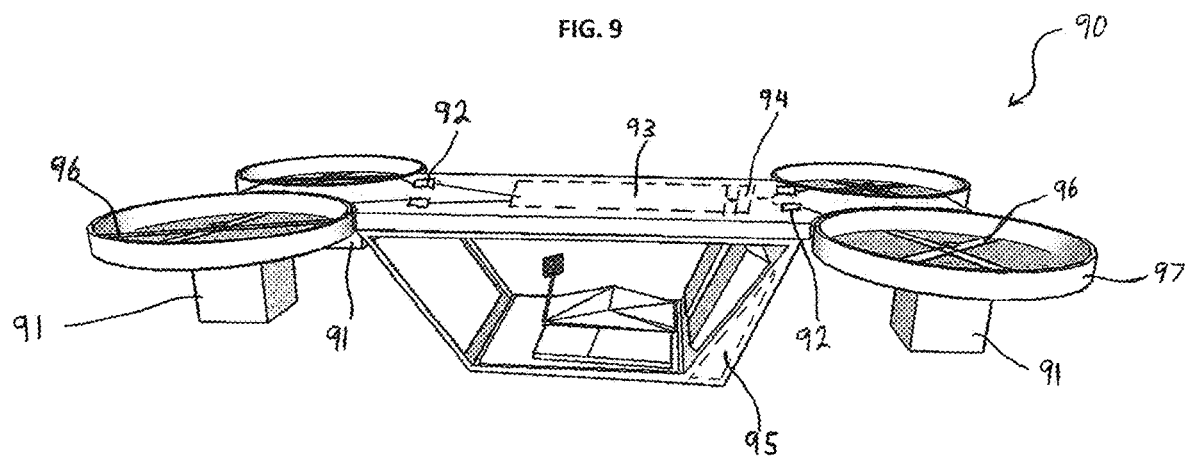
FIG. 9 shows an illustrative embodiment of an aerial vehicle according to the diagram of FIG. 1, wherein the aerial vehicle is mechanically powered.

FIG. 9 shows a mechanically powered aerial vehicle 90 according to the diagram of FIG. 1. Aerial vehicle 90 includes a fuel source 95, e.g., a vessel for storing gasoline, a mixture of gasoline and oil mixture, or similar type fuel or mixture. The fuel source 95 provides fuel to at least three engines 91. The engines can use the fuel provided by the fuel source to generate mechanical energy. Illustratively, the mechanical energy can be transferred from the engines crank/driveshaft to the mechanically powered rotors 96 directly or through a reduction gear or other means such as shafts and gearboxes or belts and pulleys. FIG. 9 shows rotors 96 attached directly to a vertical crank/drive shaft 98 of the engine 91, but it is understood that the connection may be made through a gear reduction drive mounted between the vertical crank/drive shaft 98 of the engine and the rotor 96, which may be inside a duct or shroud 97. A battery pack 93 provides power to electronic speed controls 92 configured to control the throttle position and therefore control the amount of power provided by its respective engine to the aerial vehicle. While four electronic speed controls 96 are shown, it is understood that other configurations are possible, illustratively with the number of electronic speed controls matching the number of engines. The electronic speed controls 92 are configured to work in concert with a small stepper or servo motor or actuator (not shown) that acts to adjust the throttle position of the engine 91. The electronic speed controls 92 are configured to work in concert with the stabilization device 94, which may be a gyroscope or some other computer aided device used for controlled flight of the aerial vehicle. As power is provided at varying levels to one or more engine 91 as required by the electronic speed controls 92 and the stabilizer 94 the aerial vehicle can change directions and/or speed in a controlled manner in response to input received from an operator. It is understood that some flight controllers (not shown) combine the ESC, the stabilization device, as well as a battery management system, battery monitor logger, and battery indicator display into one component or one single device.

Figure 10:
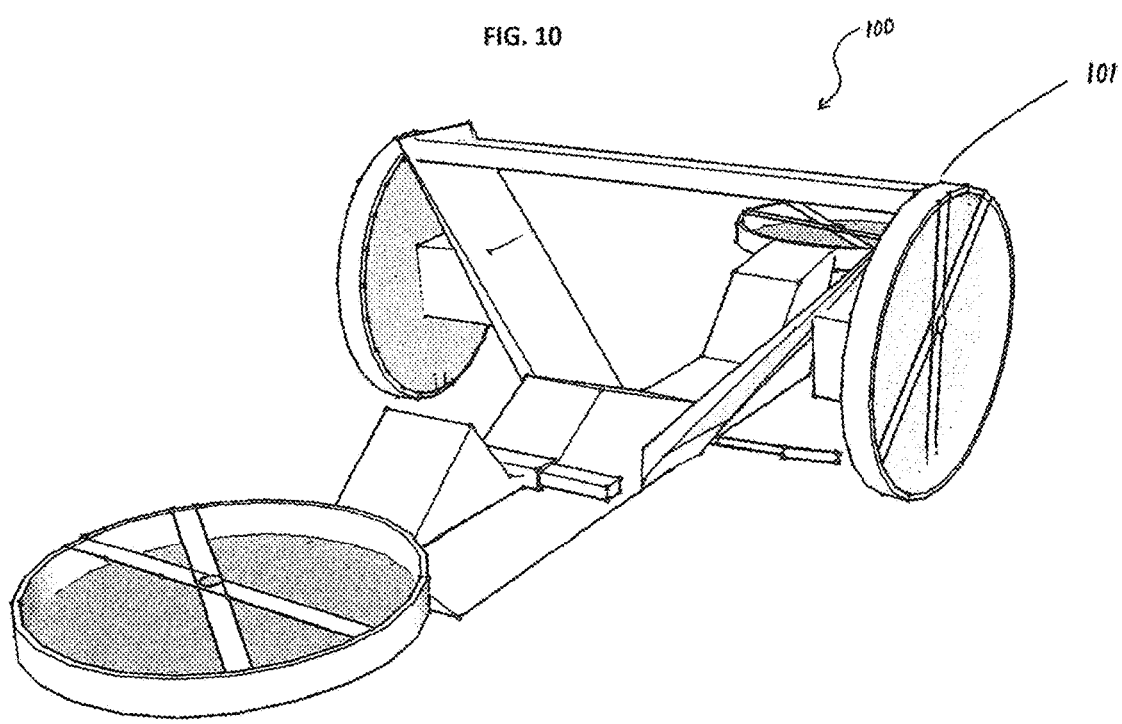
FIG. 10 shows an illustrative embodiment of an aerial vehicle with the props (rotors) of the aerial vehicle folded in for parking.

FIG. 10 shows one possible embodiment of an aerial vehicle 100. The propeller 103 may be exposed or in a shroud (also known as a shrouded propeller or ducted fan) as in this image. The prop mounting 101 may turn so the rotor 102 turns from vertical to more of a horizontal facing angle thus creating increased forward speed. The prop mounting may also be configured to pivot, as in this image where it is folded down for storage.

Figure 11:
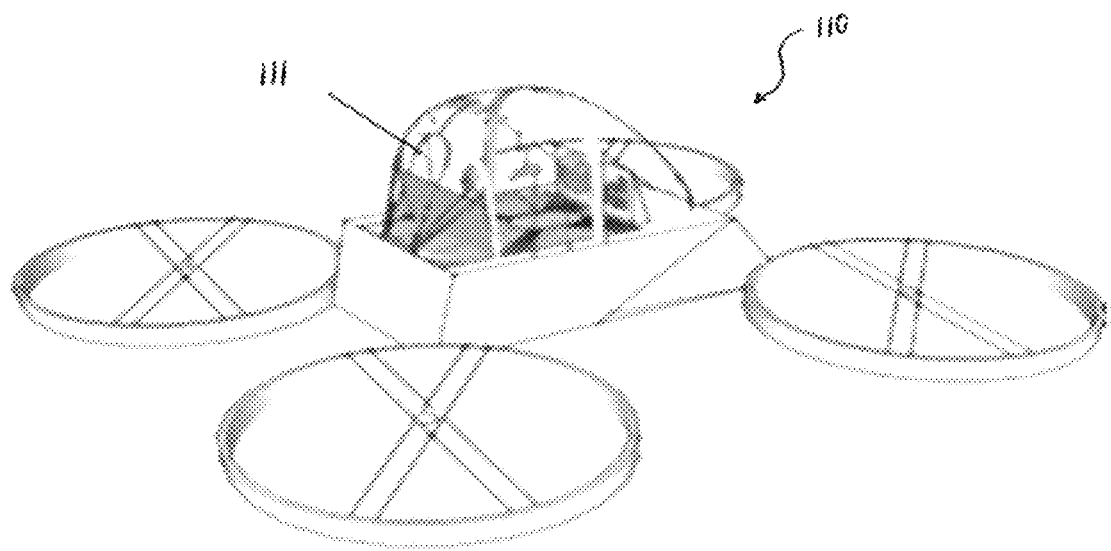
FIG. 11 shows an illustrative embodiment of an aerial vehicle with a canopy over the cockpit of the aerial vehicle giving some level of protection to the passenger inside from outside elements of weather, noise, and such.

FIG. 11 shows an illustrative embodiment of an aerial vehicle 110 with a canopy 111 over the cockpit of the aerial vehicle giving some level of protection to the passenger inside from outside elements of weather, noise, and such.

Figure 12:
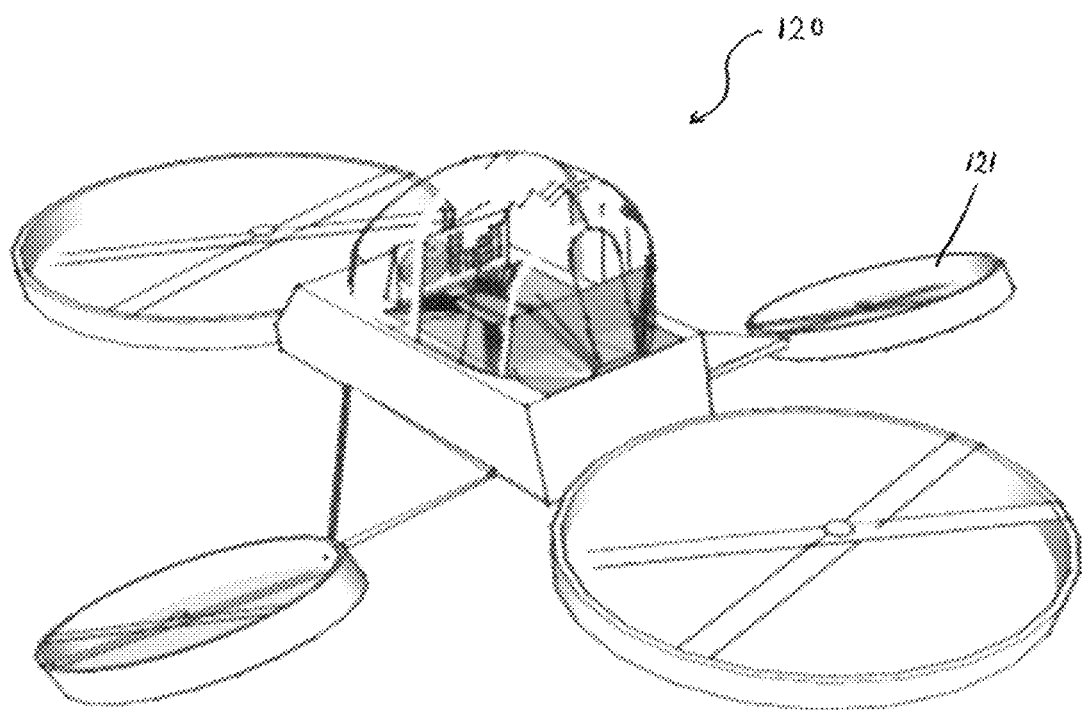
FIG. 12 shows an illustrative embodiment of an aerial vehicle with the props of the aerial vehicle tilted to assist in facilitating movement.

FIG. 12 shows an illustrative embodiment of an aerial vehicle 120 with tilt rotors 121 where the rotors (props) of the aerial vehicle are tilted to assist in facilitating movement.

Figure 13:
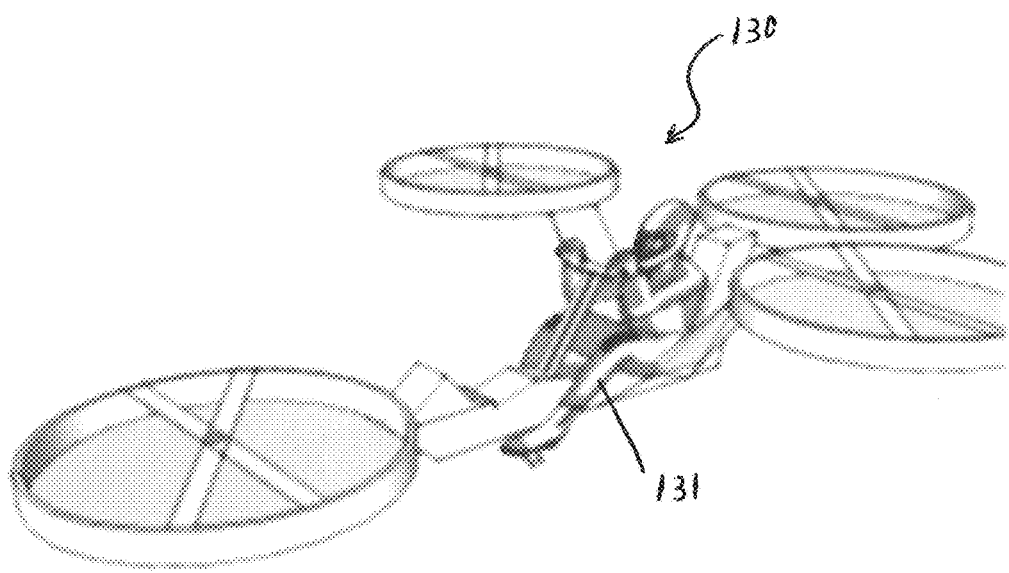
FIG. 13 shows an illustrative embodiment of an aerial vehicle where the operator rides on the outside of the aerial vehicle.

FIG. 13 shows an illustrative embodiment of an aerial vehicle 130 where the operator rides on the outside 131 of the aerial vehicle.

Figure 14:
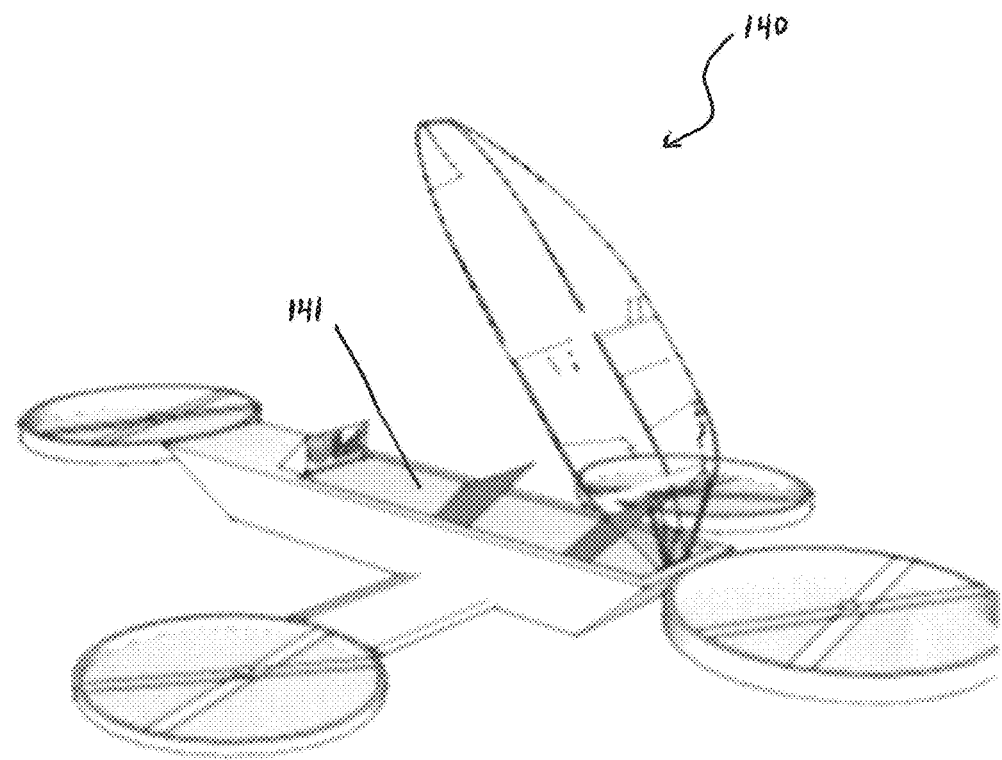
FIG. 14 shows an illustrative embodiment of an aerial vehicle where the operator rides on the inside of the aerial vehicle.

FIG. 14 shows an illustrative embodiment of an aerial vehicle 140 where the operator rides on the inside 141 of the aerial vehicle.

The invention claimed is:

1. An aerial vehicle comprising:
  a hybrid propulsion system comprising:
    a plurality of rotors configured to generate thrust and cause the aerial vehicle to fly, the plurality of rotors includes a first set of rotors and a second set of rotors, wherein:
      the second set of rotors has one or more rotors more than the first set of rotors,
      the first set of rotors is disposed at a front portion of the aerial vehicle, the front portion being forward of a central portion of the aerial vehicle, and
      the second set of rotors is disposed at a back portion of the aerial vehicle, the back portion being rearward of the central portion,
    an engine configured to drive an engine-powered rotor to rotate, the engine being directly connected to the engine-powered rotor with a drive mechanism, the engine-powered rotor being included in the plurality rotors;
    an electric-powered rotor motor configured to drive an electric motor-powered rotor to rotate, the electric motor-powered rotor is included in the plurality rotors;
    a battery pack configured to provide power to the electric-powered motor; and
    a flight control system connected to the battery pack, comprising:
      a device configured to control a throttle of the engine, the throttle being configured to control an amount of power provided by the engine to the engine-powered rotor; and a stabilization device that works in concert with an electronic speed control unit enabling stabilization of the aerial vehicle for controlled flight, wherein the engine-powered rotor and the electric motor-powered rotor are configured to enable vertical flight of the aerial vehicle.

2. The aerial vehicle of claim 1, wherein the battery pack is rechargeable, the aerial vehicle further comprising:
a genset system comprising the engine, and an electric generator system configured to provide power to the rechargeable battery pack or the rotor motor; and
a bridge rectifier configured to convert AC power generated by the genset system or a generator motor to DC power and provide the DC power to either or both the rechargeable battery and the rotor motor.

3. The aerial vehicle of claim 1, wherein there is a fuel cell used to provide electric power.

4. The aerial vehicle of claim 2, wherein the bridge rectifier is also configured to provide power to the device that is configured to control the throttle of the engine.

5. The aerial vehicle of claim 1, wherein the battery pack comprises a rechargeable battery pack that is configured to provide the power to the rotor motor when the engine and a generator motor are turned off.

6. The aerial vehicle of claim 1, wherein each of the plurality of rotors further comprises a duct or shroud.

7. The aerial vehicle of claim 1, further comprising an articulating rotor mount to act as a tilt rotor or tilt wing for increased movement or forward flight or to be folded in a downward position for parking or storage.

8. The aerial vehicle of claim 1, wherein the aerial vehicle is with or without fixed wings.

9. An aerial vehicle comprising:
a hybrid propulsion system comprising:
a plurality of rotors configured to generate thrust and cause the aerial vehicle to fly, and the plurality of rotors includes a first set of rotors and a second set of rotors, wherein:
the second set of rotors has one or more rotors more than the first set of rotors,
the first set of rotors is disposed at a front portion of the aerial vehicle, the front portion being forward of a central portion of the aerial vehicle, and
the second set of rotors is disposed at a back portion of the aerial vehicle, the back portion being rearward of the central portion,
an engine configured to drive an engine-powered rotor to rotate, the engine being directly connected to the engine-powered rotor with a drive mechanism, the engine-powered rotor being included in the plurality rotors;
an electric-powered rotor motor configured to drive an electric motor-powered rotor to rotate, the electric motor-powered rotor being included in the plurality rotors;
a battery pack configured to provide power to the electric-powered motor; and
a flight control system connected to the battery pack, wherein the flight control system is configured to provide controlled flight for the aerial vehicle to fly, wherein the engine-powered rotor and the electric motor-powered rotor are configured to enable vertical flight of the aerial vehicle.

10. The aerial vehicle of claim 9, wherein the flight control system includes an electronic speed controller, a stabilization device, a battery monitor logger, and a battery indicator display.

11. The aerial vehicle of claim 10, the electronic speed controller controls the power of the engine to meet a demand which is a load of the engine-powered rotor, and the electronic speed controller works congruently with the stabilization device to maintain controlled flight.

12. The aerial vehicle of claim 9, wherein one or more rotors in the second set of rotors is disposed tilted relative to the first set of rotors.

13. The aerial vehicle of claim 12, wherein one or more rotors in the second set of rotors is disposed perpendicular relative to the first set of rotors.

14. The aerial vehicle of claim 9, wherein the first set of rotors includes one rotor and the second set of rotors includes three rotors.

15. The aerial vehicle of claim 9, wherein the aerial vehicle also includes a second engine, a third engine, and an electronic speed controller that is configured to control the amount of power provided to the engine, the second engine, and the third engine.

16. The aerial vehicle of claim 9, further comprising an electronic speed controller that is configured to control a throttle of the engine based on a power demand of the engine-powered rotor.

17. The aerial vehicle of claim 9, wherein one or more rotors are attached directly to a vertical crank shaft of the engine.

18. The aerial vehicle of claim 9, wherein one or more rotors includes a shroud configured to prevent the one or more rotors from striking other objects.

19. An aerial vehicle comprising:
a hybrid propulsion system comprising:
a plurality of rotors configured to generate thrust and cause the aerial vehicle to fly, the plurality of rotors includes a first set of rotors and a second set of rotors, wherein:
the second set of rotors has one or more rotors more than the first set of rotors,
the first set of rotors is disposed at a front portion of the aerial vehicle, the front portion being forward of a central portion of the aerial vehicle, and
the second set of rotors is disposed at a back portion of the aerial vehicle, the back portion being rearward of the central portion,
an engine configured to drive an engine-powered rotor to rotate, the engine being directly connected to the engine-powered rotor with a drive mechanism, the engine-powered rotor being included in the plurality rotors,
an electric-powered rotor motor configured to drive an electric motor-powered rotor to rotate, the electric motor-powered rotor being included in the plurality rotors;
a battery pack that is rechargeable and configured to provide power to the electric-powered motor;
a flight control system connected to the battery pack, wherein the flight control system is configured to provide controlled flight for the aerial vehicle to fly, the flight control system comprising:
a device configured to control a throttle of the engine, the throttle being configured to control an amount of power provided by the engine to the engine-powered rotor, and
a stabilization device that works in concert with an electronic speed control unit enabling stabilization of the aerial vehicle for controlled flight;

a genset system comprising the engine, and an electric generator system configured to provide power to the rechargeable battery pack or the rotor motor; and a bridge rectifier configured to convert AC power generated by the genset system or a generator motor to DC power and provide the DC power to either or both the rechargeable battery and the rotor motor, wherein the engine-powered rotor and the electric motor-powered rotor are configured to enable vertical flight of the aerial vehicle.

* * * * *